Aug. 19, 1930.  H. G. KELLOGG  1,773,459
MACHINE FOR FORMING FASHIONED MOLDINGS
Filed Nov. 3, 1924  6 Sheets-Sheet 1
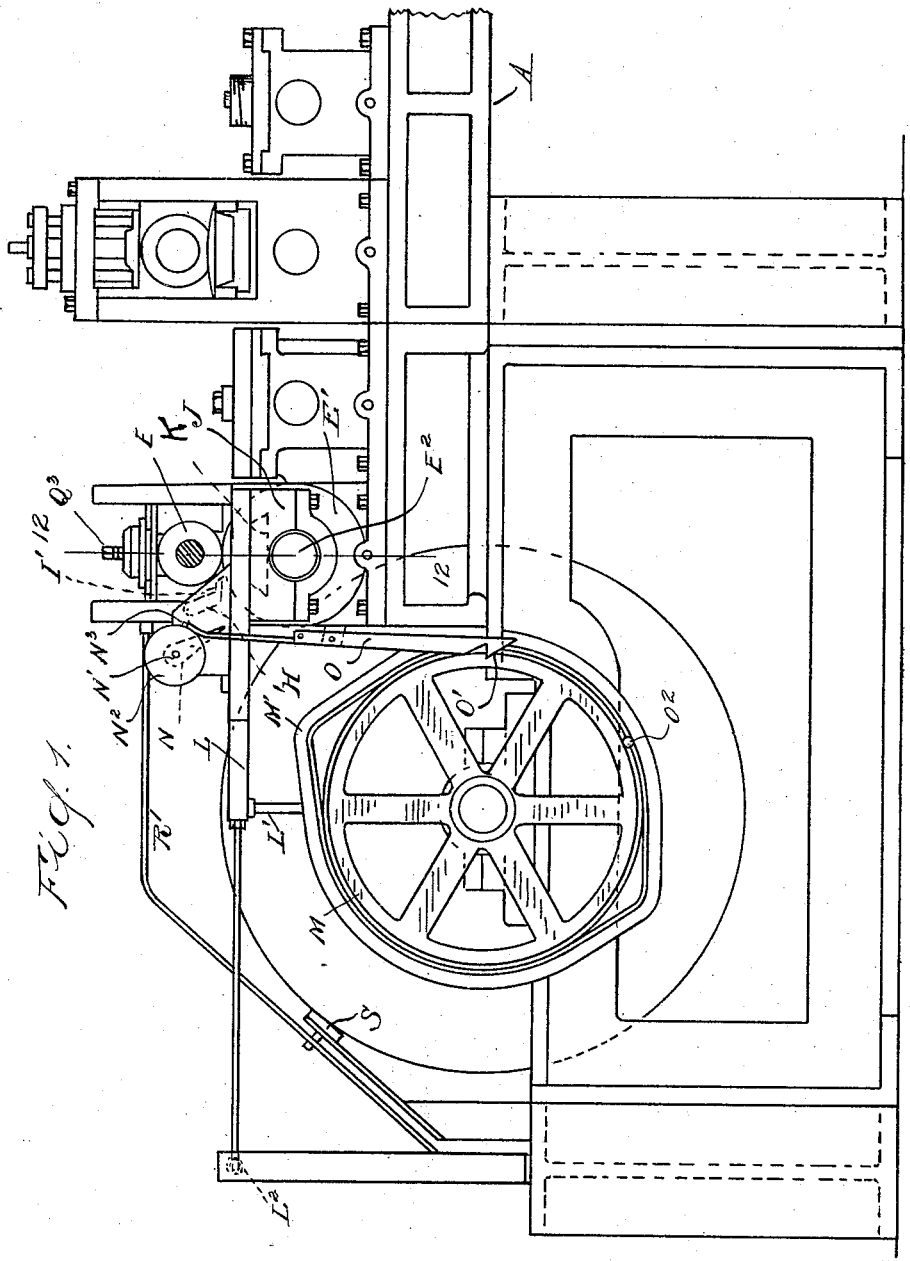
Inventor
Homer G. Kellogg
Attorneys

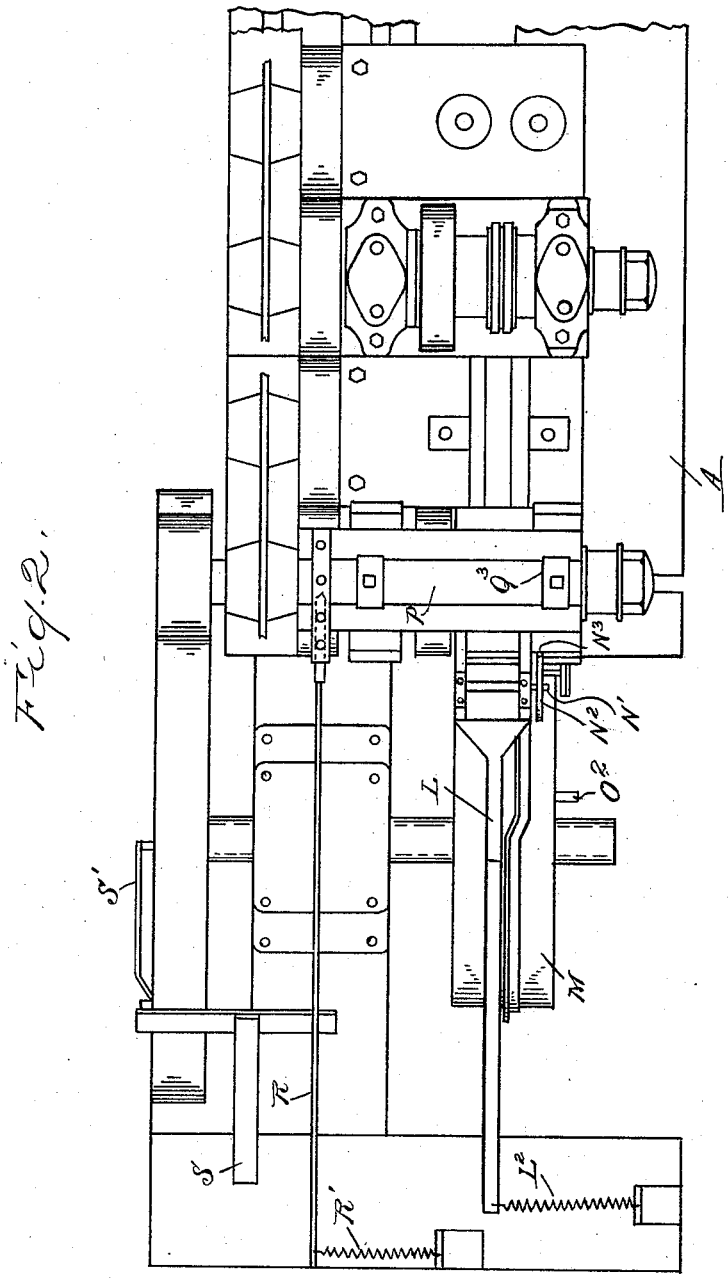

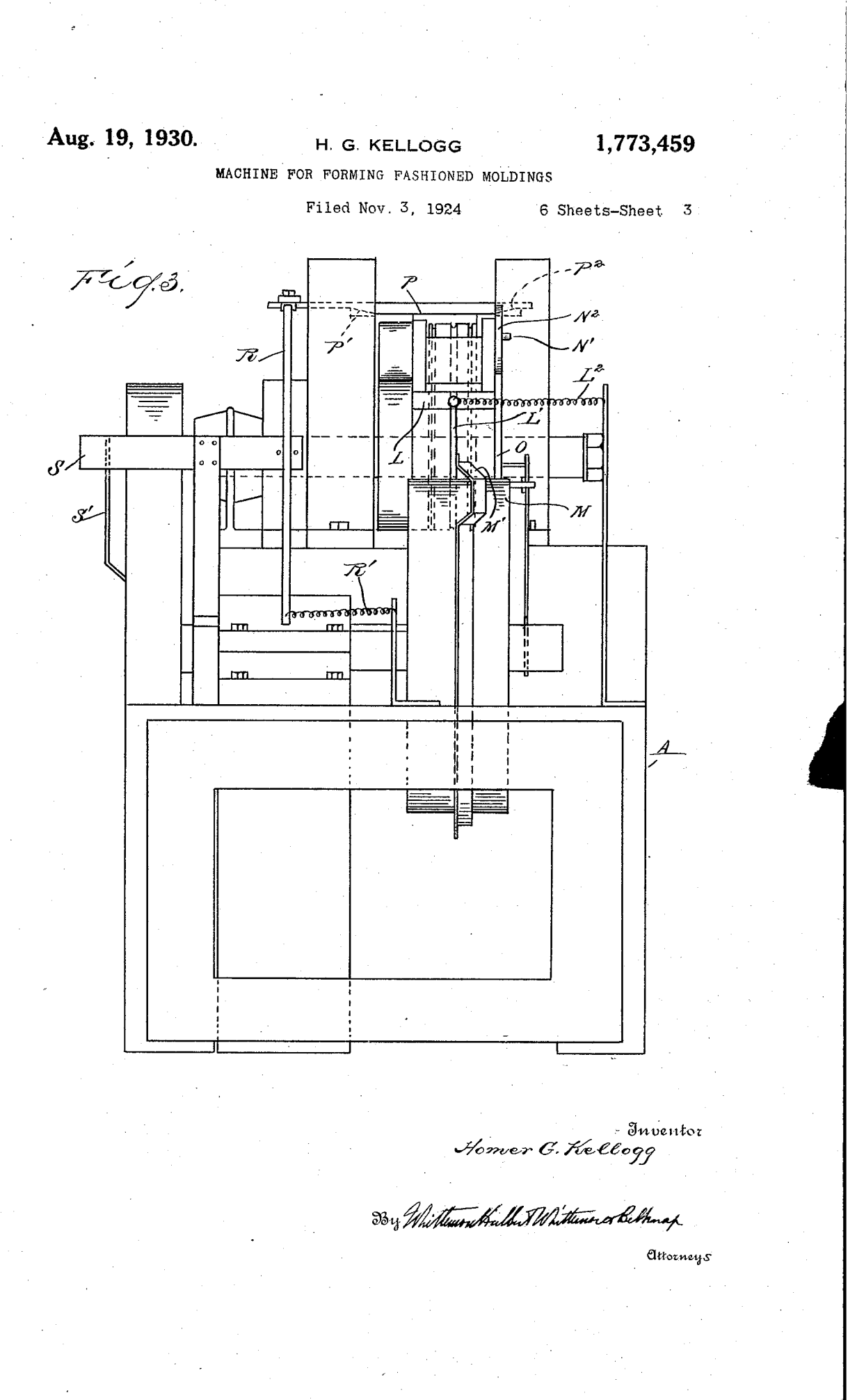

Aug. 19, 1930.            H. G. KELLOGG            1,773,459
            MACHINE FOR FORMING FASHIONED MOLDINGS
              Filed Nov. 3, 1924        6 Sheets-Sheet 3

Inventor
Homer G. Kellogg

Attorneys

Aug. 19, 1930.  H. G. KELLOGG  1,773,459
MACHINE FOR FORMING FASHIONED MOLDINGS
Filed Nov. 3, 1924  6 Sheets-Sheet 4
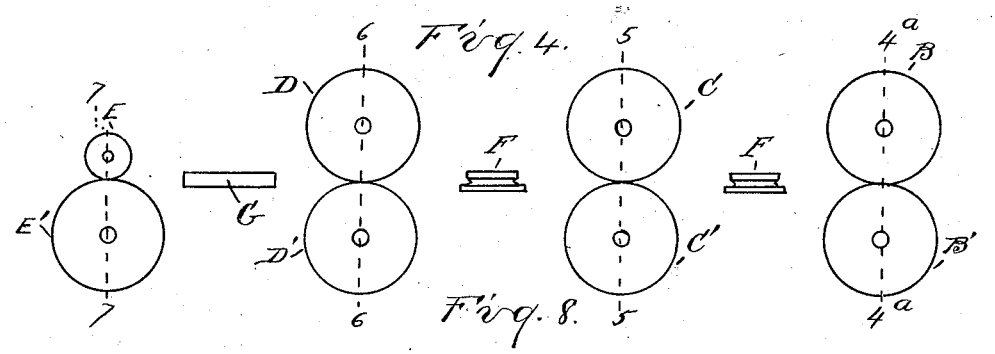
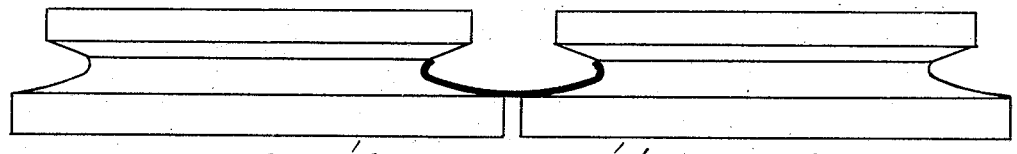
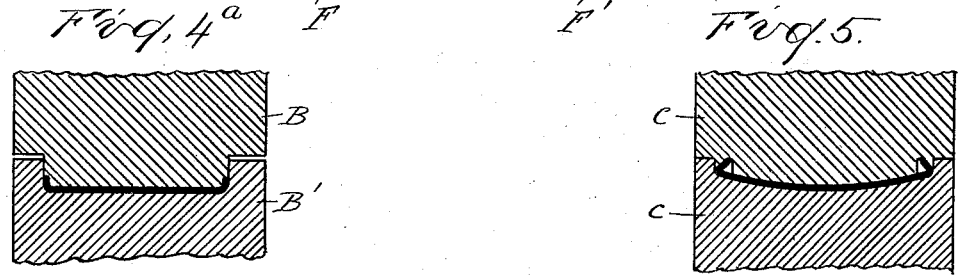
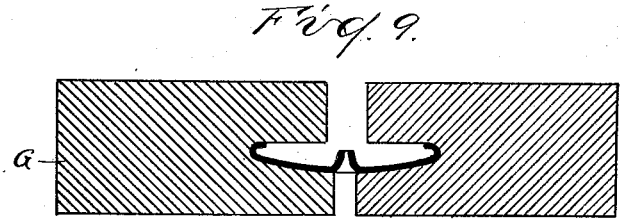
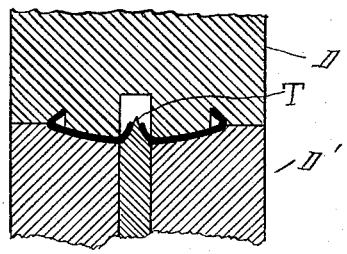
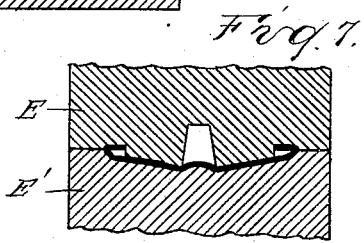
Inventor
Homer G. Kellogg
By Whitmore Hulbert Whittemore Belknap
Attorneys Aug. 19, 1930.  H. G. KELLOGG  1,773,459
MACHINE FOR FORMING FASHIONED MOLDINGS
Filed Nov. 3, 1924   6 Sheets-Sheet 5

Inventor
Homer G. Kellogg

By Whittemore, Hulbert, Whittemore & Belknap
Attorneys

Aug. 19, 1930.  H. G. KELLOGG  1,773,459
MACHINE FOR FORMING FASHIONED MOLDINGS
Filed Nov. 3, 1924  6 Sheets-Sheet 6
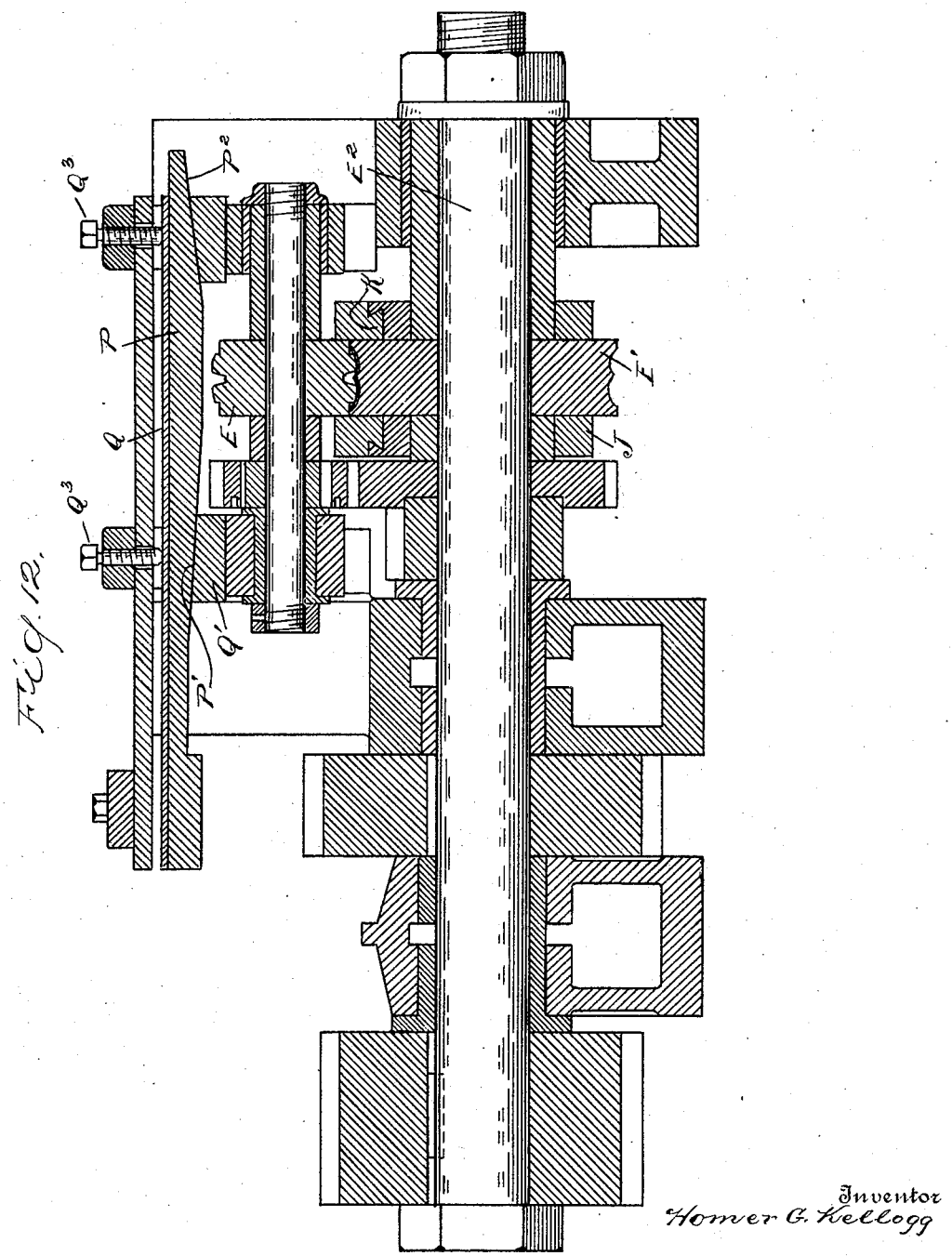
Inventor
Homer G. Kellogg
By Whitmore Hulbert Whitmore Belknap
Attorneys Patented Aug. 19, 1930

1,773,459

UNITED STATES PATENT OFFICE

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK

MACHINE FOR FORMING FASHIONED MOLDINGS

Application filed November 3, 1924. Serial No. 747,660.

The invention relates to the manufacture of moldings such as are used on automobile bodies for concealing the joints between adjacent panels and for other purposes, and the invention consists in the construction by which the molding strips are fashioned in longitudinal as well as cross-sectional contour.

In the present state of the art molding strips have been formed by advancing a flat strip of metal or other suitable material through a series of forming rolls and guides, which progressively change the cross sectional contour thereof. The moldings delivered from such machines are, however, approximately straight and to change the longitudinal contour must be subjected to further forming operations. With my improved machine the longitudinal fashioning may be accomplished in sequence to the cross-section fashioning so that the delivered molding is of the desired form in all of its dimensions.

In the drawings:

Figure 1 is a side elevation of the machine;

Fig. 2 is a plan view thereof;

Fig. 3 is an end elevation;

Fig. 4 is a diagrammatic side elevation of the rolls;

Figure 10:
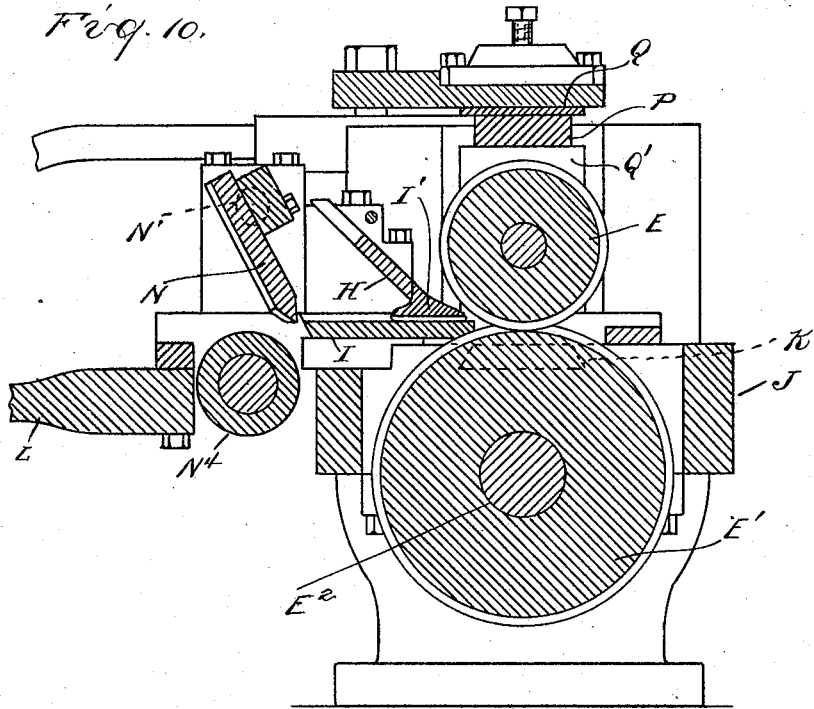
Figure 11:
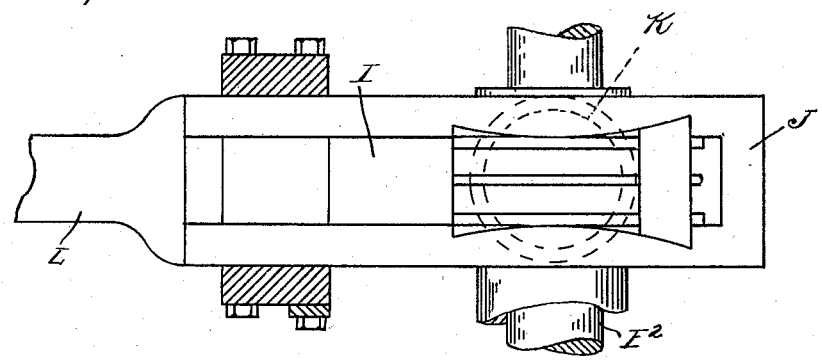

Figs. 4ª to 7 inclusive are cross sections showing the forming rolls and respectively taken on lines 4ª—4ª, 5—5, 6—6 and 7—7 of Fig. 4;

Fig. 8 is an elevational view of a pair of the forming rolls;

Fig. 9 is a section through the straight guide;

Fig. 10 is a vertical longitudinal section through the nozzle;

Fig. 11 is a sectional plan view thereof;

Fig. 12 is a cross section taken substantially on the plane indicated by line 12—12 in Figure 1.

My improved machine comprises a suitable frame A upon which is mounted a series of pairs of rolls B B', C C', D D' and E E' having horizontal axes. There are also arranged intermediate said rolls pairs of forming rolls having vertical axes F, F' and between the rolls D and E the straight guide G. Thus as shown in Figs. 4ª to 9, the strip fed between the rolls will be successively fashioned in cross-sectional contour to that required for the finished molding.

Adjacent to the rolls E E' there is mounted upon the frame a strip delivery nozzle H capable of universal angular movement in relation to said rolls. As shown this nozzle H comprises a straight grooved guide member I, which extends into the throat between the rolls and which is mounted on a bearing block J pivoted upon the shaft E² of the roll E'. There is also a pivotal connection between the guide I and the block J, permitting swinging in a transverse plane, said pivots being indicated at K. I' is a shoe extending into the grooved guide I for holding the fashioned strip in engagement therewith. L is an arm projecting outward from the nozzle H and provided with a depending foot portion L' which engages a cam wheel M. This cam is fashioned both in the plane of rotation and transversely thereof so that in each cycle the nozzle H will be angularly moved in transverse planes. Specifically the cam consists of an angle cross section guide rail M' surrounding the circular body of the wheel and the foot L' is held in engagement with this rail by gravity and by the tension of the spring L².

Mounted upon the nozzle H is a severing blade N having its cutting edge conforming generally to the cross-sectional contour of the strip. This blade is supported on the pivot N' and is adjustable so that it may be set to a radial length such as to sever the strip when swinging in contact therewith. Normally the blade is held at an oblique angle so as to be out of contact with the strip, this being effected by a disk N² on the end of the pivot shaft having a projecting lug N³ which engages the end of a stop lever O. The lever O is pivoted to the frame and has its lower end provided with a cam face O' which extends into the path of a pin O² projecting laterally from the cam wheel M. The arrangement is such that when the pin O² engages the cam O', it will rock lever O, withdrawing the stop from the lug N³ and permitting the blade N to fall into contact with the moving strip. The friction of such contact will then pull the blade forward, pressing the cutting edge through the material and against a supporting roll N⁴. The operator may then complete the revolution of the disk whereupon the lug N³ will engage the stop lever O and hold the blade in oblique position until another cycle is completed.

Cooperating with the mechanism for angularly adjusting the nozzle H there is provided means for varying pressure of the roll E on opposite edge portions of the strip. This has the effect of thinning the gage of metal on one or the other side of the strip, facilitating the bending of the strip towards the opposite side. As shown this mechanism comprises a cross bar P, which extends parallel to and above the roll E. The bar is provided with cams or wedge portions P' P² at opposite ends thereof which pass between a stationary bearing Q on the frame and a vertically movable bearing Q' in which the shaft for the roll E is journaled. R is an arm extending forward from the bar P having its end attached to a spring R', and being engaged intermediate its ends by a transversely movable bar S actuated by a cam S' on the shaft of the cam wheel M. The form of the cam is such that during each cycle the arm R is moved by the rod S to adjust the rod P first in one direction and then in the reverse direction. This will cause the cams P' and P² to alternately press down the bearings on the opposite end of the shaft for the rolls P so as to increase the pressure first on one side and then on the other. To adjust this pressure set screws Q³ are arranged to engage opposite ends of the bearing Q so as to move the same in relation to the frame.

The mechanism that has been described is driven in properly timed relation by suitable gearing, not described in detail, so that the complete operation of the machine is as follows: When a flat strip is passed between the rolls B, C, D, it will be progressively changed in cross-sectional contour as shown in Figs. 4 to 9 inclusive. The steps, as specifically shown, are: first, turning up the edge flanges; second, return-bending these flanges and simultaneously bowing the intermediate portion of the section; third, rolling said section to the desired curve; fourth, placing a reverse curved groove in the center of the strip; fifth, puncturing the strip at intervals in said groove by the points T on the roll D'. From the rolls D, D', the fashioned strip passes through the straight guide G, which takes out any longitudinal curvature incident to the forming action. The strip then passes between the rolls E, E', and into the nozzle H. This nozzle is moved through a predetermined path, swinging both horizontally in the plane of travel of the strip and vertically according to the pattern determined by the cam M', and this pattern is such that it will impart the desired curvature or bends to the strip. At the completion of the cycle the severing blade N is stripped and will cut off the molding in the advance thereof, after which the operation is repeated.

It is obvious that the strip might be bent or curved solely by the action of the angularly movable nozzle H, but better results are secured where this is combined with variable pressure of the roll E on opposite edge portions of the strip. This precludes any wrinkling and imparts to the finished product a perfectly smooth contour.

The nozzle H preferably has its vertical pivotal axis in the plane of contact between the rolls E and E². To permit of this the block J is bifurcated to embrace the roll E' and the nozzle H is also slotted for the passage of said roll. The pivot K is thus formed by segments on opposite sides of this slot and the walls of the slot are curved, as indicated at K', to permit the proper degree of angular movement. Thus the strip, which is clamped along the line of contact between the rolls E and E' and which is further guided by the groove in the nozzle H, will be subjected to a drawing action during the angular movement of the nozzle, which will give the desired curvature without buckling or wrinkling. Also, as has been already stated, the varying pressures between the rolls E and E² will thin the gage of the metal on the side of the strip which is being elongated.

What I claim as my invention is:

1. The combination with means for advancing a molding strip, of a guide through which said strip is delivered and a second guide adjacent to said first-mentioned guide and angularly movable during the passage of the strip therethrough for imparting to the strip a predetermined longitudinal contour.

2. The combination with means for advancing a molding strip, of a guide through which said strip is delivered, and means adjacent to said guide universally automatically angularly adjustable for guiding the delivered portion of said strip and imparting thereto a predetermined longitudinal contour.

3. The combination with means for advancing a strip, of cooperating means for fashioning the advancing strip to a predetermined cross-sectional contour, and universally adjustable means operating upon the strip delivered from the cross sectional forming means for imparting thereto a bend in the plane of travel of the said strip.

4. The combination with means for advancing a strip, of cooperating means for fashioning the advancing strip to a predetermined cross-sectional contour, and means operating upon the strip delivered from the cross sectional forming means for imparting thereto a predetermined longitudinal contour in planes angularly arranged with respect to each other.

5. The combination with means for advancing a molding strip of fashioned cross-sectional contour, of a nozzle through which said strip is passed angularly adjustable during the advancement of the strip to impart thereto a predetermined longitudinal contour.

6. The combination with means for advancing a molding strip of fashioned cross-sectional contour, of a guide through which said strip is delivered, a nozzle adjacent to said guide through which said strip passes and means for angularly adjusting the nozzle during the advancement of the strip to impart thereto a predetermined longitudinal contour.

7. The combination with means for advancing a straight molding strip having a fashioned cross sectional contour, of a guide through which said straight strip is delivered, an angularly adjustable nozzle adjacent to said guide and through which the strip passes and means automatically operable for adjusting the nozzle during the passage of the strip therethrough for imparting a predetermined longitudinal contour to the strip.

8. The combination with means for advancing a molding strip of fashioned cross-sectional contour, of a guide through which said strip is delivered, a nozzle adjacent to said guide, and means for angularly adjusting said nozzle in intersecting planes for imparting to said strip a predetermined longitudinal contour in the respective planes.

9. The combination with means for advancing a molding strip of fashioned cross-sectional contour, of means for retaining a portion of said strip against lateral displacement, and a guide for engaging the portion of the strip in advance of the retained portion, universally angularly movable to bend the same to a predetermined longitudinal contour.

10. The combination with means for advancing a molding strip of fashioned cross-sectional contour, of a pair of rolls conforming to the cross-sectional contour of the strip for retaining the same in a transverse line, and a nozzle through which the advanced portion of the strip is delivered pivoted about an axis angularly arranged with respect to said line of retaining contact.

11. The combination with a pair of fashioned rolls for advancing a strip of corresponding cross-sectional contour, of a nozzle pivoted about an axis of one of said rolls to swing in a plane transverse thereto and also pivoted about an axis transverse to said first-mentioned axis and passing substantially through the line of contact between said rolls.

12. The combination with a pair of fashioned rolls for advancing a strip of corresponding cross-sectional contour, of a bifurcated bearing embracing one of said rolls and pivoted about the axis thereof, a nozzle pivoted to said bearing about an axis transverse to the axis of said roll and slotted for the passage of said roll, and means for moving said nozzle angularly about each of its axes.

13. The combination with a pair of fashioned rolls for engaging a strip in corresponding cross-sectional contour, of a universally pivoted nozzle adjacent to said rolls, means for moving said nozzle angularly, and cooperating means for applying different pressures to spaced portions of said rolls.

14. The combination with a pair of rolls for engaging a strip of corresponding cross-sectional contour, of a nozzle universally pivoted for angular movement with respect to the common tangent plane of said rolls and the plane perpendicular thereto, means for adjusting said nozzle angularly, and means for varying the pressure on opposite ends of said rolls.

15. The combination with means for advancing a molding or like strip in a rectilinear path and in the direction of its length, of a guide engaging said molding and movable in the plane of travel of said molding to automatically bend the same to a predetermined longitudinal contour.

16. The combination with means for advancing a molding or like strip, of means for fashioning the strip to a predetermined cross-sectional contour and a movable guide adapted to intermittently bend the same to a predetermined longitudinal contour.

17. The combination with means for advancing a molding strip in a rectilinear path, of means for fashioning the strip to a predetermined cross-sectional contour and a movable guide for laterally bending the said strip in the plane of its travel to form the same to a predetermined longitudinal contour.

18. The combination with means for advancing a molding strip in a rectilinear path, of means for fashioning the strip to a predetermined cross-sectional contour during its travel in a rectilinear path, of a movable guide for bending the said strip in the plane of its travel, and in a second plane angularly arranged with respect to the plane of its travel for imparting to the said strip a predetermined longitudinal contour.

19. The combination with means for advancing a molding strip, of a movable guide engaging said molding strip, and a revoluble cam for moving said guide in planes transverse to each other for bending the strip to a predetermined longitudinal contour.

20. The combination with means for advancing a molding strip, of a cam controlled movable guide engaging said molding adapted to bend the same to a predetermined longitudinal contour, and means also controlled by said cam for severing the molding into predetermined lengths.

21. The combination with means for advancing a molding strip, of a universally movable guide engaging said strip and automatically operable at intervals to bend the strip to a predetermined longitudinal contour.

22. The combination with means for advancing a molding strip, of an adjustable nozzle through which said strip is passed, and means automatically operable for angularly adjusting the nozzle during the passage of the strip therethrough to impart a predetermined longitudinal contour to the strip.

In testimony whereof I affix my signature.

HOMER G. KELLOGG.